US010086271B2

(12) United States Patent
Linde et al.

(10) Patent No.: US 10,086,271 B2
(45) Date of Patent: Oct. 2, 2018

(54) CONTROL DEVICE FOR CONTROLLING A CAMERA ARRANGEMENT AND A METHOD FOR CONTROLLING AN AUGUMENTED REALITY APPLICATION PROGRAM OF THE CAMERA ARRANGEMENT

(71) Applicant: Facebook, Inc., Menlo Park, CA (US)

(72) Inventors: Oskar Linde, Belmont, CA (US); Lars Anders Bond, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 164 days.

(21) Appl. No.: 15/038,030

(22) PCT Filed: Nov. 4, 2014

(86) PCT No.: PCT/SE2014/051296
§ 371 (c)(1),
(2) Date: May 19, 2016

(87) PCT Pub. No.: WO2015/076719
PCT Pub. Date: May 28, 2015

(65) Prior Publication Data
US 2016/0296836 A1 Oct. 13, 2016

(30) Foreign Application Priority Data

Nov. 25, 2013 (SE) ...................................... 1351399

(51) Int. Cl.
*H04N 5/225* (2006.01)
*A63F 13/219* (2014.01)
(Continued)

(52) U.S. Cl.
CPC .......... *A63F 13/219* (2014.09); *A63F 13/213* (2014.09); *A63F 13/2145* (2014.09);
(Continued)

(58) Field of Classification Search
CPC .. H04N 5/23293; A63F 13/219; A63F 13/213
(Continued)

(56) References Cited

U.S. PATENT DOCUMENTS 8,388,243 B1 * 3/2013 Smith .................. G03B 17/566
396/422
8,469,824 B1 * 6/2013 Farley ........................ F41J 5/02
434/11
(Continued)

FOREIGN PATENT DOCUMENTS

CN 203483841 U 3/2014

OTHER PUBLICATIONS

PCT International Search Report and Written Opinion, PCT/SE2014/051296, dated Mar. 10, 2015, 12 Pages.

*Primary Examiner* — Usman Khan
(74) *Attorney, Agent, or Firm* — Fenwick & West LLP

(57) ABSTRACT

The present invention relates to a control device for controlling a camera arrangement (1), said control device having a front end and a back end, said control device comprising: attachment means (2) configured to attach a camera arrangement (1) to said control device; gripping means (3) configured to facilitate for a user to hold said control device; interaction means (4; 7; 8; 9) configured for controlling a camera arrangement (1) when attached to said control device; wide-angle lens means (5) arranged to be positioned on said attachment means (2) in front of a camera lens of a camera arrangement (1) when attached to said control device; and actuator means (6) configured to control said interaction means (4; 7; 8; 9) and arranged at said gripping means (3) to facilitate use thereof for a user holding said control device by said gripping means (3), wherein said attachment means (2) is arranged on said control device to fix a camera lens of a camera arrangement (1) when attached to said control device towards the front end of said control (Continued)

device, and to fix a touchscreen of a camera arrangement (1) when attached to said control device towards the back end of said control device.

10 Claims, 4 Drawing Sheets

(51) Int. Cl.
*G03B 17/56* (2006.01)
*H04N 5/232* (2006.01)
*A63F 13/837* (2014.01)
*A63F 13/245* (2014.01)
*A63F 13/65* (2014.01)
*A63F 13/213* (2014.01)
*A63F 13/2145* (2014.01)
*A63F 13/98* (2014.01)
*G03B 17/02* (2006.01)
*A63F 13/90* (2014.01)

(52) U.S. Cl.
CPC ............ *A63F 13/245* (2014.09); *A63F 13/65* (2014.09); *A63F 13/837* (2014.09); *A63F 13/90* (2014.09); *A63F 13/98* (2014.09); *G03B 17/02* (2013.01); *G03B 17/56* (2013.01); *H04N 5/23293* (2013.01)

(58) Field of Classification Search
USPC .................................................... 348/207.99
See application file for complete search history.

(56) References Cited

U.S. PATENT DOCUMENTS

| | | | |
|---|---|---|---|
| 2002/0031350 A1* | 3/2002 | Ohnogi | H04N 5/232 396/429 |
| 2006/0017858 A1* | 1/2006 | Lin | H04N 5/44 348/790 |
| 2013/0113827 A1 | 5/2013 | Forutanpour et al. | |
| 2013/0176412 A1* | 7/2013 | Chen | H04N 7/183 348/77 |
| 2013/0257848 A1 | 10/2013 | Westerinen et al. | |

* cited by examiner

CONTROL DEVICE FOR CONTROLLING A CAMERA ARRANGEMENT AND A METHOD FOR CONTROLLING AN AUGUMENTED REALITY APPLICATION PROGRAM OF THE CAMERA ARRANGEMENT

TECHNICAL FIELD

The invention generally relates to control devices, and particularly relates to control devices for controlling camera arrangements.

BACKGROUND

So called augmented reality is e.g. used for overlaying virtual objects and information on a view of the real world. This is often done by overlaying virtual information on top of the feed from a camera, for example the camera of a mobile device. The mobile device may be held up towards an object so that the object is visible in a view display of the mobile device as a virtual object therein. The mobile device then overlays virtual information on the virtual object the in the view display, which view display thus is showing an augmented realty of objects in front of the camera. The term augmented reality is also used in a broader sense, wherein virtual objects are overlain a virtual background, and wherein e.g. the feed from a camera is used to position the virtual background and/or the virtual objects.

In order to augment reality, the mobile device needs to understand what is in front of the camera, i.e. where the camera is pointing. This can be done in several ways, such as e.g. through the so called SLAM (Simultaneous Localization And Mapping) technique.

SUMMARY

A possible utilization of augmented reality for a mobile device is e.g. to play a shooting game on a mobile device such as a smartphone, based on the environment around the smartphone. However, it may be difficult to control the shooting game when running around e.g. a game area. The same problem applies to any camera arrangement allowing similar utilization of a shooting game providing augmented reality.

An object of the present invention is to facilitate control of a camera arrangement.

This object, among others, is according to the present invention attained by a control device and a method, respectively, as defined by the appended claims.

The present invention solves the problem described above by providing a control device for facilitating control of a camera arrangement.

By providing a control device for controlling a camera arrangement, the control device having a front end and a back end, the control device comprising: attachment means configured to attach a camera arrangement to the control device; gripping means configured to facilitate for a user to hold the control device; interaction means configured for controlling a camera arrangement when attached to the control device; wide-angle lens means arranged to be positioned on the attachment means in front of a camera lens of a camera arrangement when attached to the control device; and actuator means configured to control the interaction means and arranged at the gripping means to facilitate use thereof for a user holding the control device by the gripping means, wherein the attachment means is arranged on the control device to fix a camera lens of a camera arrangement when attached to the control device towards the front end of the control device, and to fix a touchscreen of a camera arrangement when attached to the control device towards the back end of the control device, control of the camera arrangement is achieved, for e.g. playing shooting games based on augmented reality.

The interaction means preferably comprises a touch arrangement configured to touch a touchscreen of a camera arrangement when attached to the control device, such that by triggering the actuator means the touch arrangement touches the touchscreen to control the camera arrangement. In this way a completely passive control device may me provided, not needing any electronic equipment or any power source.

The interaction means alternatively comprises a magnet arrangement arranged on a lens/front side of the attachment means, and being configured to magnetically control a camera arrangement when attached to the control device, such that by triggering the actuator means the magnet arrangement controls the camera arrangement. In this way a completely passive control device may me provided, not needing any electronic equipment or any power source.

Advantageously, the magnet arrangement is configured to magnetically control a magnetic field sensor of a camera arrangement when attached to the control device, such that by triggering the actuator means the magnet arrangement controls the camera arrangement. In this way The magnet arrangement preferably comprises at least two magnets, having different polarization. In this way utilization of multiple inputs is facilitated.

Alternatively, the interaction means comprises connector means configured to electrically connect to I/O interface means of a camera arrangement when attached to the control device. In this way a well defined control of the camera arrangement is provided.

The interaction means alternatively comprises a speaker or audio signal generator configured to send control signals to a camera arrangement when attached to the control device, through microphone means or other audio input means of the camera arrangement. In this way a well defined control of the camera arrangement is provided.

The interaction means yet alternatively comprises a wireless communication unit configured to send control signals to a camera arrangement when attached to the control device, through wireless communication means of the camera arrangement. In this way a well defined control of the camera arrangement is provided.

The actuator means preferably comprises multiple input means configured to control the camera arrangement in multiple ways. In this way multiple control of the camera arrangement is facilitated.

The present invention also provides a method to facilitate control of a camera arrangement.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
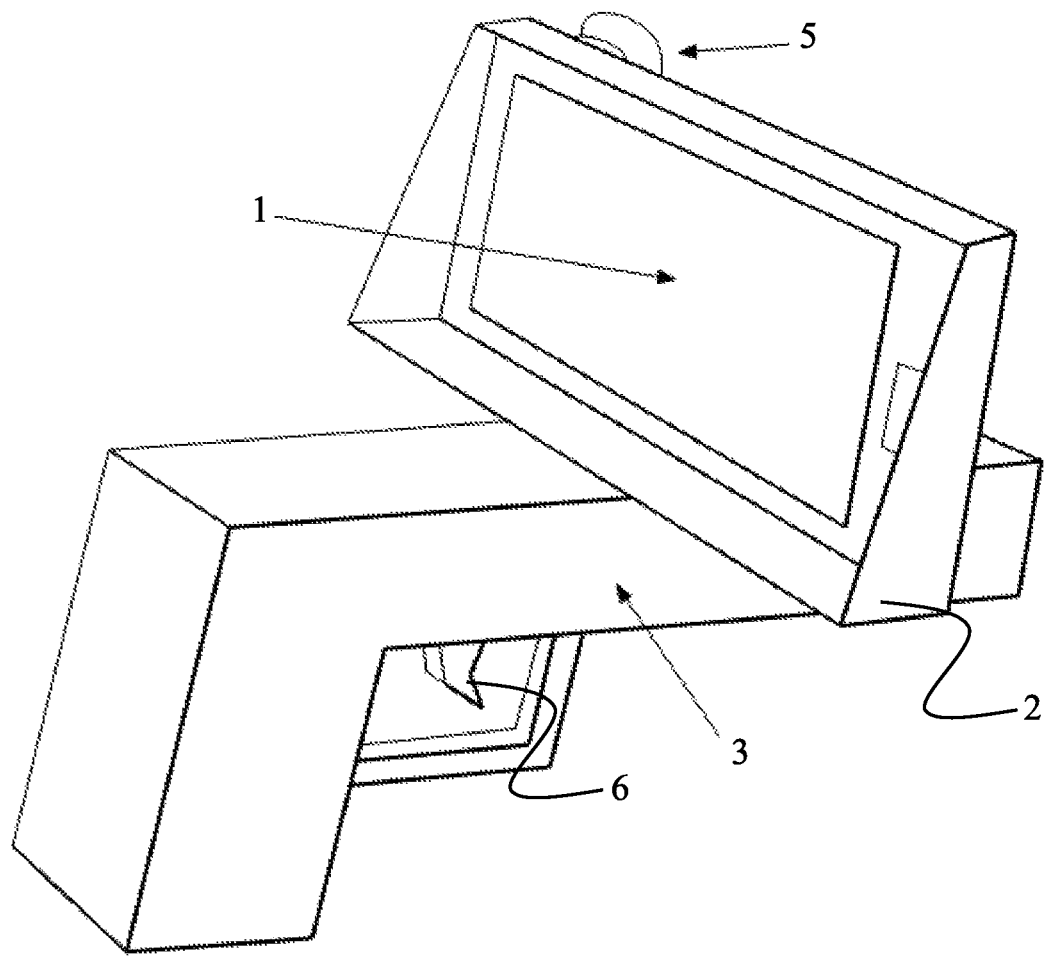
FIG. 1 illustrates a right-side elevation-view of a control device according to a first embodiment of the present invention.
Figure 2:
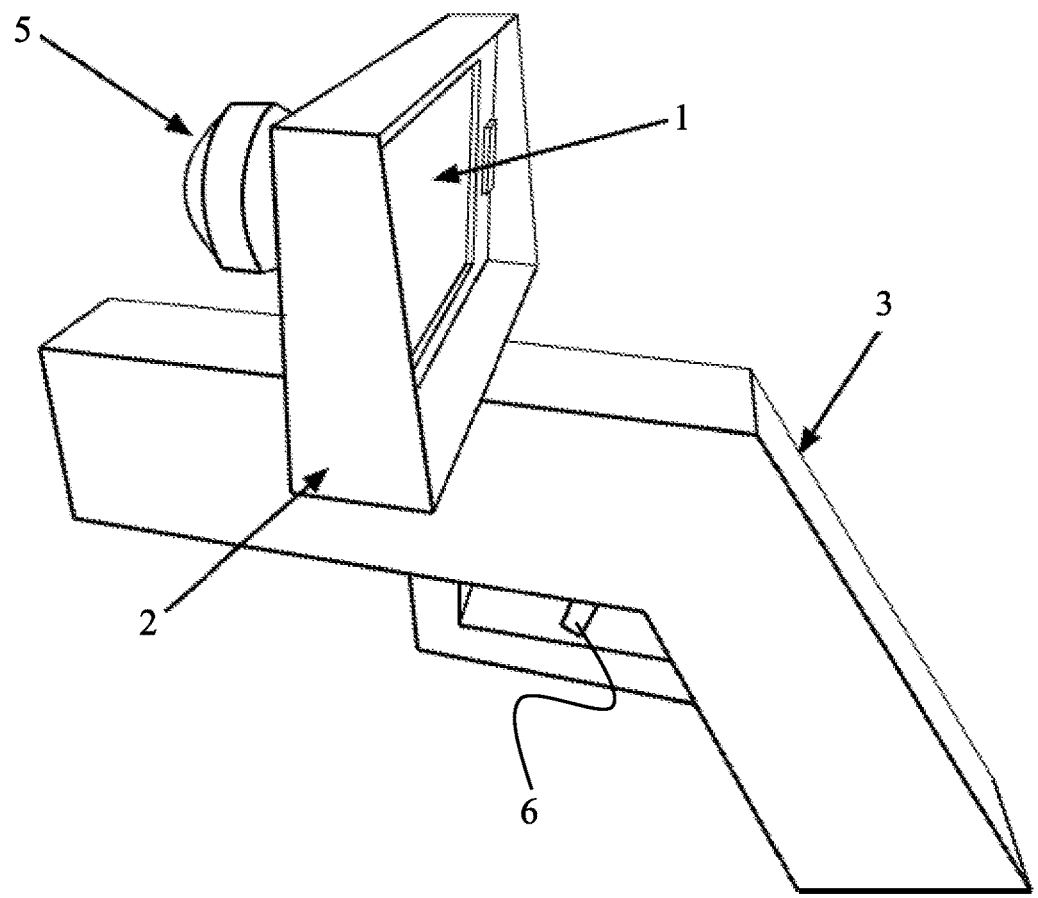
FIG. 2 shows a left-side elevation-view of the control device illustrated in FIG. 1.
Figure 3:
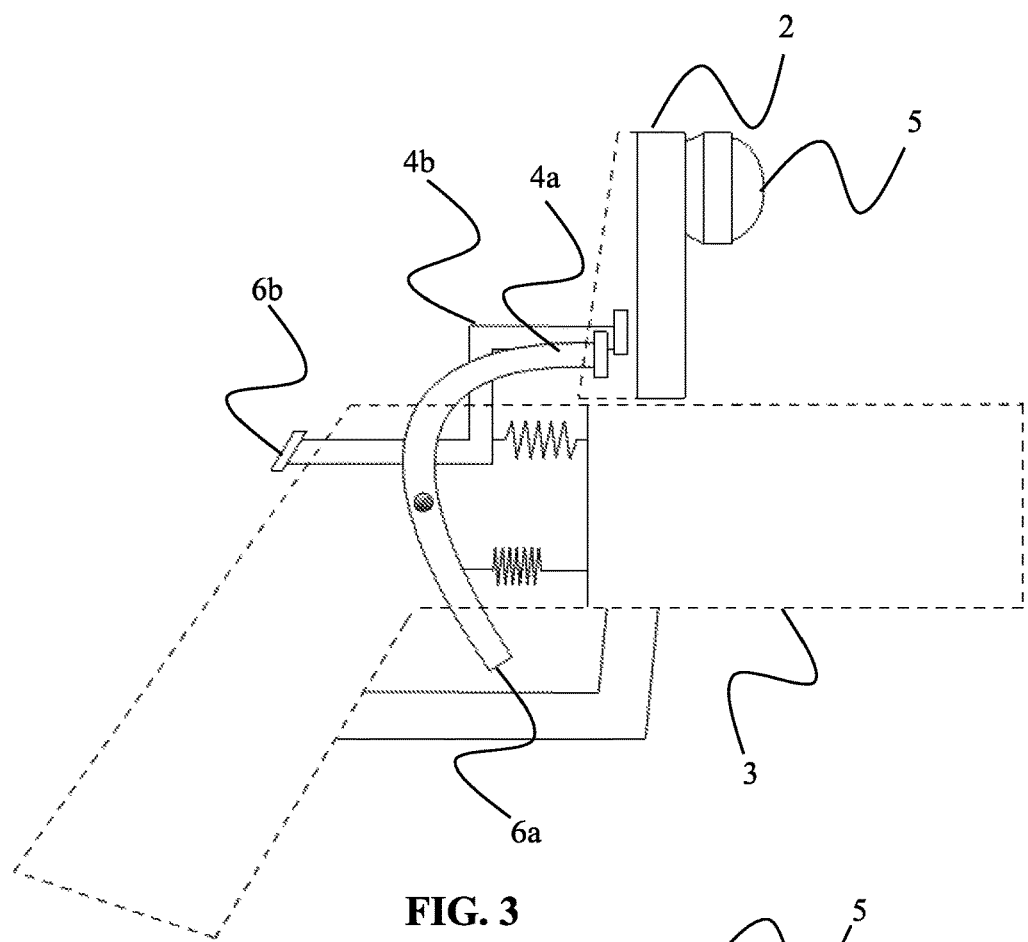
FIG. 3 illustrates, in a partly cut-away, right-side view, interfacing means of a control device according to a first embodiment of the present invention.

A control device for controlling a camera arrangement according to a first embodiment of the present invention will now be described with reference to FIGS. 1-3.

The control device has a front end and a back end, and the control device comprises:

attachment means 2 configured to attach a camera arrangement 1 to the control device;

gripping means 3 configured to facilitate for a user to hold the control device;

interaction means 4 configured for controlling a camera arrangement 1 when attached to the control device;

wide-angle lens means 5 arranged to be positioned on the attachment means 2 in front of a camera lens of a camera arrangement 1 when attached to the control device; and actuator means 6 configured to control the interaction means 4 and arranged at the gripping means 3 to facilitate use thereof for a user holding the control device by the gripping means 3.

The attachment means 2 is arranged on the control device to fix a camera lens of a camera arrangement 1 when attached to the control device towards the front end of the control device, and to fix a touchscreen (display) of a camera arrangement 1 when attached to the control device towards the back end of the control device. The attachment means 2 is preferably configured to snap fit a camera arrangement of a predefined configuration, to facilitate well defined positions for touch pads and wide-angle lens means of the control device relative the camera arrangement.

The interaction means 4 comprises a touch arrangement 4 configured to touch a touchscreen of a camera arrangement 1 when attached to the control device, such that by triggering the actuator means 6 the touch arrangement touches the touchscreen to control the camera arrangement 1.

The actuator means 6 preferably comprises multiple input means configured to control the camera arrangement 1 in multiple ways, but may alternatively comprise a single actuator/trigger connected to a single interaction pad for single input.

In this first embodiment the actuator means 6 comprises two separate actuators/triggers 6a and 6b. The interaction means 4 correspondingly comprises two touch pads 4a and 4b integrally formed with a respective actuator.

A first trigger 6a is positioned at a natural position for an index finger, when holding the gripping means 3. The first trigger 6a has a natural pulling triggering direction backwards and is biased through a spring to facilitate fast repetition of such movements. When the first trigger 6a is pulled the corresponding interaction means 4a is pushed onto a first position of the touchscreen of the camera arrangement 1, thereby controlling a first action thereof.

A second trigger 6b is positioned at a natural position for thumb, when holding the gripping means 3. The second trigger 6b has a natural pushing triggering direction forward and is biased through a spring to facilitate fast repetition of such movements. When the second trigger 6b is pushed the corresponding interaction means 4b is pushed onto a second position of the touchscreen of the camera arrangement 1, thereby controlling a second action thereof.

The control device may be shaped as a weapon, in this case a revolver/gun having natural gripping means at the butt of the revolver/gun. The control device may alternatively be shaped as a rifle, having two different natural gripping means positions, one for each hand at the butt and barrel, respectively. Each position may then have one or more triggers.

Examples of camera arrangements having touchscreens are e.g. smartphones and tablet devices (such as iPad®, iPod®).

Wide-angle lens means 5 may e.g. be a fish-eye lens, preferably with 180° field-of-view. Also a more limited field-of-view will also function, such as a field-of-view of about 165°, however with a little less robustness. The optical distortion caused by the fish-eye lens can together with the optical distortion of possible other lenses in the camera arrangement be modeled by software and be digitally corrected for. Other types of wide-angle lenses with other projective mapping functions are also possible and the distortion can likewise be modeled by software in a similar way.

A method for controlling an application program of a camera arrangement 1, the camera arrangement 1 comprising a camera lens arranged in a front end thereof and a touchscreen arranged in a back end thereof, and the application providing augmented reality onto the touchscreen when images from the camera lens are displayed on the touchscreen, wherein the method comprises the steps of:

attaching the camera arrangement 1 into an attachment means 2 of a control device;

imaging a wide area in front of the camera arrangement 1 into the camera lens through wide-angle lens means 5; and controlling the application program by interaction means 4 of the control device arranged at the camera arrangement, the interaction means 4 in turn being controlled by actuator means 6 of the control device.

Thus, when triggering the triggers 6a and 6b a shooting game running on the camera arrangement, displaying augmented reality of what is in front of the wide-angle lens means 5, may e.g. fire shots at virtual targets shown on the touchscreen thereof.

The application program thus primarily utilizes the information from the camera feed to position the virtual overlay of the display relative to the background, which background may be either a reproduced real world scene, or a completely fictitious background. The application program also utilizes the information from the camera feed to translate movement of the control device to movement of the virtual overlay of the display.

Since the control device according to the first embodiment does not need to be provided with a power source to control device can thus be a non-powered control device.

Figure 4:
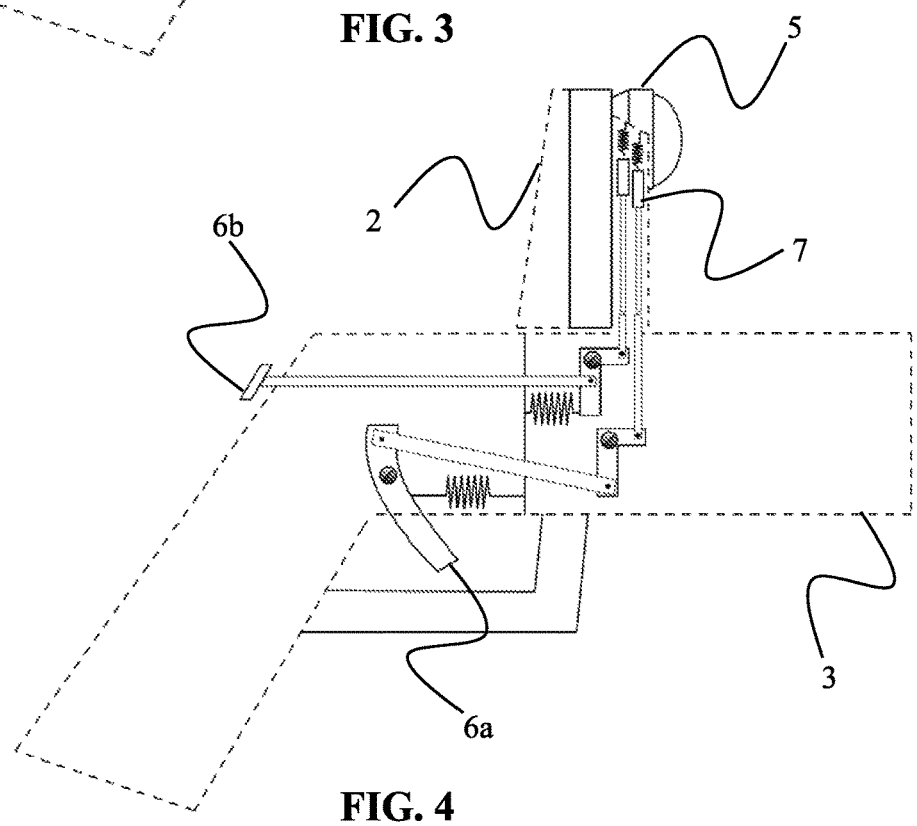
FIG. 4 illustrates, in a partly cut-away, right-side view, interfacing means of a control device according to a second embodiment of the present invention.

A control device for controlling a camera arrangement according to a second embodiment of the present invention will now be described with reference to FIG. 4. The control device according to the second embodiment is similar to the control device of the first embodiment described above, apart from the following.

The control device comprises interaction means 7 having a magnet arrangement 7 arranged on a lens/front side of the attachment means 2, and being configured to magnetically control a camera arrangement 1 when attached to the control device, such that by triggering the actuator means 6a, 6b the magnet arrangement 7 controls the camera arrangement 1.

The magnet arrangement 7 is preferably configured to magnetically control a magnetic field sensor of a camera arrangement 1, such as a magnetic field sensor for compass functions, when attached to the control device, such that by triggering the actuator means 6 the magnet arrangement 7 controls the camera arrangement 1. By moving a magnet, preferably a permanent magnet, relative the magnetic field sensor, signaling therefrom can be used by an application program running on the camera device to control desired functions of the application program.

The magnet arrangement 7 preferably comprises two separate magnets, having different polarization, one for each trigger 6a and 6b. By having different polarization of the different magnets, detection of interaction of the respective magnet is facilitated.

By having articulated connections between the interaction means 7 and the actuators 6, orthogonal change of movement direction is attained. Further, by having biasing springs attached both at the magnet 7 as well as at the trigger 6, quick repeated action is facilitated.

Since the control device according to the second embodiment does not need to be provided with a power source to control device can thus be a non-powered control device.

Figure 5:
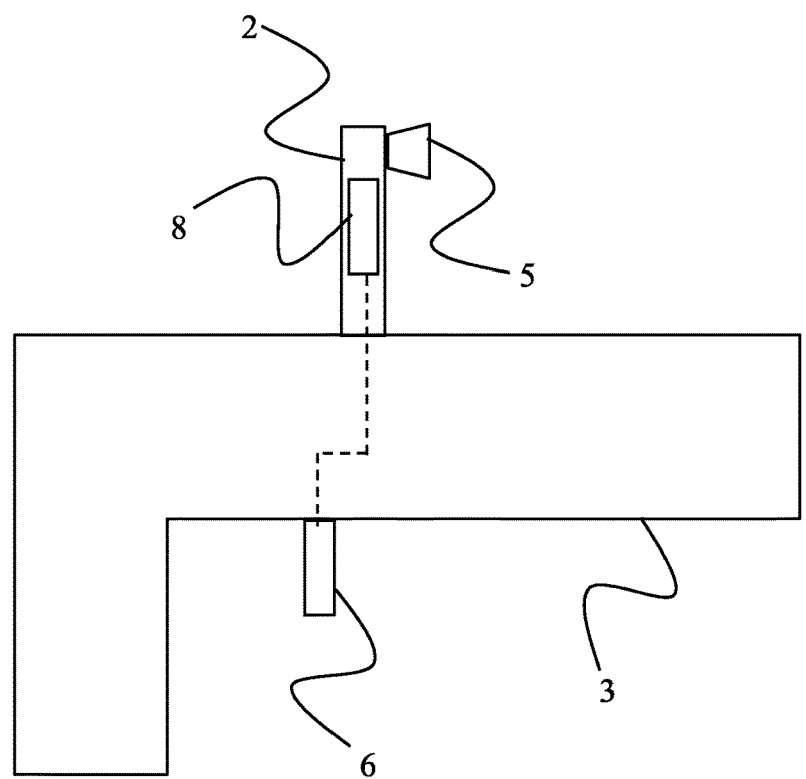
FIG. 5 schematically illustrates interfacing means of a control device according to a third embodiment of the present invention.

A control device for controlling a camera arrangement according to a third embodiment of the present invention will now be described with reference to FIG. 5. The control device according to the third embodiment is similar to the control device of the first embodiment described above, apart from the following.

The interaction means 8 comprises connector means 8 configured to electrically connect to I/O interface means of a camera arrangement 1 when attached to the control device. The attachment means 2 preferably comprises guide means to facilitate mechanically and electrically connecting a connector 8 thereof to a predefined I/O interface connector of the camera arrangement, at the same time as the camera arrangement is attached to the attachment means.

In this case the control device needs electronic equipment to convert mechanical movement of the actuator(s) 6 to suitable signaling to be sent to the camera arrangement 1. Due to that the control device needs electronic equipment, it is preferably also provided with a power source for handling thereof.

When the control device anyhow is provided with a power source, further power requiring means may be added to the control device, such as e.g. vibration means for game feedback, or other biometric feedback.

The interaction means may alternatively comprise a speaker or audio signal generator configured to send control signals to a camera arrangement 1 when attached to the control device, through microphone means or audio input means of the camera arrangement 1. Also this alternative needs to be provided with power, entailing similar effects. The speaker is advantageously arranged to be positioned close to the microphone of the camera arrangement.

Figure 6:
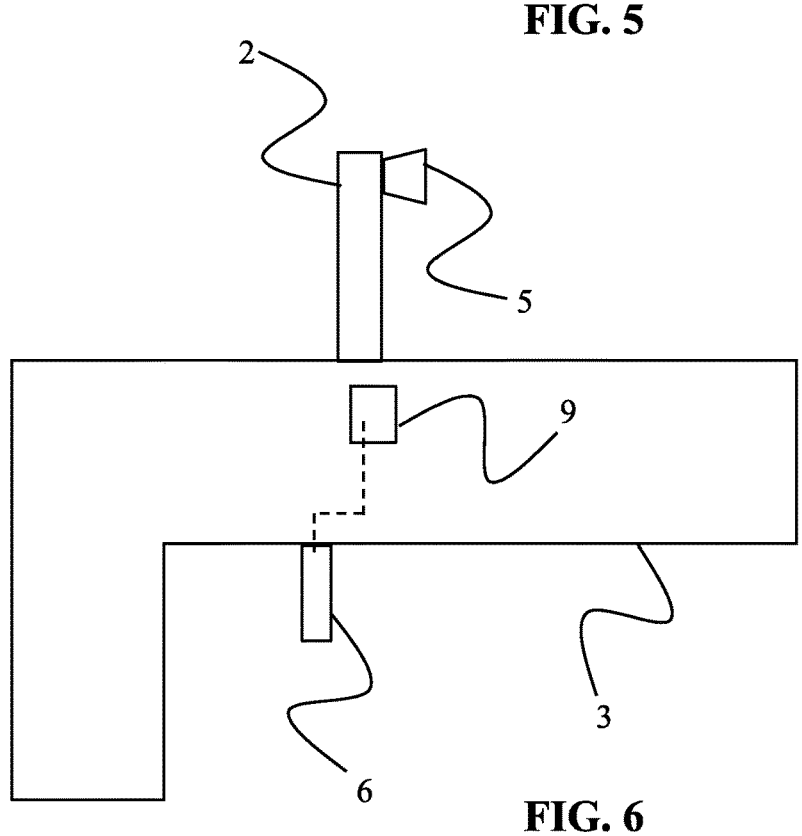
FIG. 6 schematically illustrates interfacing means of a control device according to a fourth embodiment of the present invention.

A control device for controlling a camera arrangement according to a fourth embodiment of the present invention will now be described with reference to FIG. 6. The control device according to the fourth embodiment is similar to the control device of the first embodiment described above, apart from the following.

The interaction means 9 comprises a wireless communication unit 9 configured to send control signals to a camera arrangement 1 when attached to the control device, through wireless communication means 9 of the camera arrangement 1. Bluetooth communication is preferably utilized for the wireless communication between the control device and the camera arrangement. Alternatively, e.g. WiFi communication can be utilized.

In this case the control device needs electronic equipment to convert mechanical movement of the actuator(s) 6 to suitable signaling to be sent to the camera arrangement 1. Due to that the control device needs electronic equipment, it is preferably also provided with a power source for handling thereof.

When the control device anyhow is provided with a power source, further power requiring means may be added to the control device, such as e.g. vibration means for game feedback, or other biometric feedback. Also, the control device may be provided with an inertial measurement unit, comprising gyroscope and/or accelerometer, to improve robustness of e.g. a SLAM-implementation, which advantageously may be used to complement a camera device lacking such functions.

A control device, according to any of the above mentioned embodiments may, if provided with a power source, have a camera arrangement integrally arranged in the control device, obviating the need of an attachment means.

When electronic signaling is utilized to control an integrally arranged camera arrangement, the display thereof need not be a touchscreen. Further, the lens of the camera arrangement is preferably also integrally arranged with the control device, obviating the need of an auxiliary wide-eye lens arrangement. The lens may further be substituted with a depth sensor (a camera working with an active technique, such as IR light projected in a predetermined pattern or being pulsed to measure a time-of-flight).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A control device for controlling a camera arrangement, the control device having a front end and a back end, the control device comprising:
   attachment means configured to attach a camera arrangement to the control device;
   gripping means configured to facilitate for a user to hold the control device;
   interaction means configured for controlling the camera arrangement when attached to the control device, the interaction means comprising a magnet arrangement arranged on the attachment means;

wide-angle lens means arranged to be positioned on the attachment means in front of a camera lens of the camera arrangement when attached to the control device; and actuator means configured to control the interaction means and arranged at the gripping means to facilitate use thereof for the user holding the control device by the gripping means, wherein the attachment means is arranged on the control device to fix the camera lens of the camera arrangement when attached to the control device towards the front end of the control device, and to fix a touchscreen of the camera arrangement when attached to the control device towards the back end of the control device, and the interaction means is configured to magnetically control the camera arrangement such that by triggering the actuator means the magnet arrangement controls the camera arrangement.

2. The control device of claim 1, wherein the interaction means further comprises a touch arrangement configured to touch the touchscreen of the camera arrangement when attached to the control device, such that by triggering the actuator means the touch arrangement touches the touchscreen to control the camera arrangement.

3. The control device of claim 1, wherein the magnet arrangement is configured to magnetically control a magnetic field sensor of the camera arrangement when attached to the control device, such that by triggering the actuator means the magnet arrangement controls the camera arrangement.

4. The control device of claim 1, wherein the magnet arrangement comprises at least two separate magnets, having different polarization.

5. The control device of claim 1, wherein the interaction means further comprises connector means configured to electrically connect to I/O interface means of the camera arrangement when attached to the control device.

6. The control device of claim 1, wherein the interaction means further comprises a speaker configured to send control signals to the camera arrangement when attached to the control device, through microphone means of the camera arrangement.

7. The control device of claim 1, wherein the interaction means further comprises a wireless communication unit configured to send control signals to the camera arrangement when attached to the control device, through wireless communication means of the camera arrangement.

8. The control device of claim 1, wherein the actuator means comprises multiple input means configured to control the camera arrangement in multiple ways.

9. A method for controlling an application program of a camera, the method comprising:

a camera arrangement comprising a camera lens arranged in a front end thereof and a touchscreen arranged in a back end thereof, and the application program providing augmented reality onto the touchscreen when images from the camera lens are displayed on the touchscreen, wherein the method comprises the steps of:

attaching the camera arrangement into an attachment means of a control device;

imaging a wide area in front of the camera arrangement into the camera lens through wide-angle lens means; and controlling the application program by interaction means of the control device arranged at the camera arrangement, the interaction means comprising a magnet arrangement arranged on the attachment means and configured to magnetically control the camera arrangement such that by triggering actuator means of the control device the magnet arrangement controls the camera arrangement.

10. A control device for controlling a camera arrangement, the control device having a front end and a back end, the control device comprising:

the camera arrangement;

gripping means configured to facilitate for a user to hold the control device;

interaction means configured to control the camera arrangement, the interaction means comprising a magnet arrangement;

camera means configured to feed the camera arrangement with positioning information of the control device; and actuator means configured to control the interaction means and arranged at the gripping means to facilitate use thereof for the user holding the control device by the gripping means, wherein the control device is configured to fix the camera means towards the front end of the control device, and to fix a display of the camera arrangement towards the back end of the control device, and the interaction means is configured to magnetically control the camera arrangement such that by triggering the actuator means the magnet arrangement controls the camera arrangement.

* * * * *

UNITED STATES PATENT AND TRADEMARK OFFICE
CERTIFICATE OF CORRECTION

PATENT NO. : 10,086,271 B2  
APPLICATION NO. : 15/038030  
DATED : October 2, 2018  
INVENTOR(S) : Oskar Linde and Lars Anders Bond Page 1 of 1

It is certified that error appears in the above-identified patent and that said Letters Patent is hereby corrected as shown below:

On the Title Page

Item (54) and in the Specification Column 1, Line 3 Title Delete "AUGUMENTED" and insert --AUGMENTED-- therefor Signed and Sealed this  
Twenty-second Day of October, 2019

Andrei Iancu  
*Director of the United States Patent and Trademark Office*